May 21, 1935.    S. KYSER    2,002,016

TOOL FOR INSERTING VALVE LOCK WASHERS OR KEEPERS

Filed May 4, 1932    2 Sheets-Sheet 1

INVENTOR.
SMITH KYSER
BY
A. D. Caesar
Charles W. Rivise
ATTORNEYS

May 21, 1935. S. KYSER 2,002,016
TOOL FOR INSERTING VALVE LOCK WASHERS OR KEEPERS
Filed May 4, 1932 2 Sheets-Sheet 2

INVENTOR.
SMITH KYSER
BY
A. D. Caesar
Charles W. Rivise
ATTORNEYS

Patented May 21, 1935

2,002,016

UNITED STATES PATENT OFFICE 2,002,016

TOOL FOR INSERTING VALVE LOCK WASHERS OR KEEPERS

Smith Kyser, Philadelphia, Pa., assignor to Aircraft Specialties, Inc., a corporation of Delaware Application May 4, 1932, Serial No. 609,129

5 Claims. (Cl. 81—3)

This application constitutes a continuation in part of application Serial No. 516,295 filed by me on February 17, 1931, for an inserter for valve keepers.

The present invention relates to new and useful improvements in tools for inserting valve keepers or lock washers.

A primary object of the present invention is to provide a device of this type capable of inserting valve keepers or lock washers of both the horseshoe and split-annulus type. The latter type of washer comes in a wide range and variety of shapes and sizes and hitherto no one tool has been capable of handling more than a restricted range of shapes and sizes. The device of the present invention is capable of handling and inserting any one of the entire range of shapes and sizes of valve keepers now in use.

Another object is to provide a blank out of which may be fashioned or formed the tool which constitutes the subject matter of the present invention.

Other objects and aims of this invention, more or less specific than those referred to hereinabove, will be in part obvious and in part pointed out in the course of the following description of the elements, combinations, arrangements of parts and applications of principles, constituting the invention.

In the drawings:—

Figure 1:
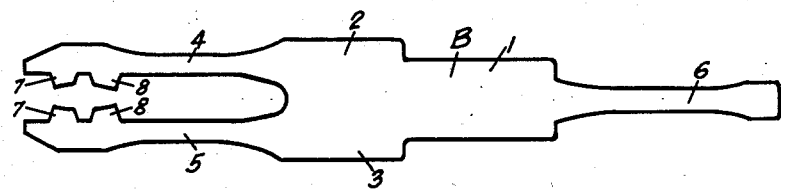
Figure 1 is a plan view of a flat blank of metal out of which may be formed or fashioned the main portion of the tool which constitutes the subject matter of the present invention.

Referring more particularly to the drawings and especially to Figure 1 thereof, it will be seen that reference character B designates a flat blank out of which I prefer, for reasons which will hereinafter appear, to fashion or form the main portion of my lock washer inserting tool. The blank may be formed of any highly resilient metal or alloy or of a metal or alloy which is capable of being rendered highly resilient by a heat or tempering treatment. I prefer to stamp the blank out of a thin sheet of untempered chrome-molybdenum steel so that after it is fashioned into its final form the tool may have imparted to it the desired degree of resiliency by suitable heat or tempering processes. As shown in Figure 1, the blank B has a main body portion 1 provided with the lateral wings 2 and 3 and terminating at one end in the two substantially parallel spaced arms 4 and 5 and at its opposite end in the tail portion 6. Each of the two arms is shown provided on the inner edge near its free end with a set of projections 7, 8. This particular form of blank requires a minimum amount of material for its fabrication and lends itself readily to be fashioned into the tool shown in Figure 2.

Figure 2:
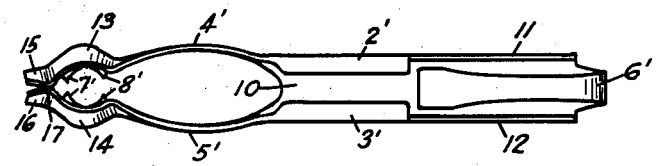
Figure 2 is a top plan view of the main portion of my tool.

The manner in which the main portion of my tool is formed from the blank B can be readily seen by comparing Figures 1 and 2. The guideway 10 and the flanges 11, 12 are formed by first bending the entire edge portions of the body 1 at right angles and then bending over the wings 2 and 3 into parallelism (2' and 3') with the body portion. The tongue 6' is formed by bending the tail 6 into parallelism with the body. Each of the arms 4 and 5 of the blank is fashioned to form the bow-shaped spring arms 4' and 5', the cooperating washer gripping elements 13 and 14 and the pointed tips 15 and 16.

Particular attention is directed to the form of construction of the left half of the main portion of the device. Each spring arm (4' and 5') is formed by bending or twisting the corresponding portion of the arm (4 and 5) of the blank from a horizontal plane surface to a vertical curved surface which is substantially bow-shaped in horizontal cross-section. Each tip (15 and 16) is formed by bending or twisting the corresponding portion of the arm (4 and 5) of the blank from a flat horizontal surface to a diverging inclined surface contacting its mate at 17. Each of the washer gripping elements (13 and 14) is formed by bending or twisting the arm intermediate the spring arm (4' and 5') and the tip (15 and 16) to form a continuously curved surface which is inclined to the horizontal so that the two gripping elements cooperate to form a split frusto-conical cup. It is to be noted (see Figure 5) that the upper edge of each gripping element is a flat horizontal curve connecting the upper edge of the bow-shaped spring arm (4' and 5') and that of the tip (15 and 16). Furthermore that the sets of tongues or projections 7' and 8' cooperate with the split cup formed by the gripping elements 13 and 14 to form a tapering seat for a small object such as a valve lock washer or keeper.

As thus far described, the device is eminently suited for inserting valve lock washers of the horseshoe type. The operation of inserting lock washers of this type is relatively simple—the washer is placed in the split cup of the tool with its open end facing the front end of the tool, the valve retainer cup is raised by means of a lifter, the front end of the tool is pressed against the groove of the valve stem to force the tool together with the washer on to the stem and about the groove, the lifter is released and finally the inserting tool is removed.

Figure 3:
Figure 3 is a side view in cross section of the tongue or spreader bar which forms an essential part of my tool when it is to be used for inserting keepers or washers of the split-annulus or two piece type.

For use with lock washers of the split-annulus type, the device of the present invention may be provided with a tongue, plunger or spreader bar such as is indicated by the numeral 25. As shown in Figure 3, this element has a flat main body portion of rectangular cross-section terminating at one end in a pronounced hump or protuberance 26 and provided substantially midway between the protuberance and the opposite end with an upwardly extending pin 27. It will be noted that the end near the protuberance 26 is tapered and provided with a recess 28 and is substantially on the same level as the opposite end.

Figure 4:
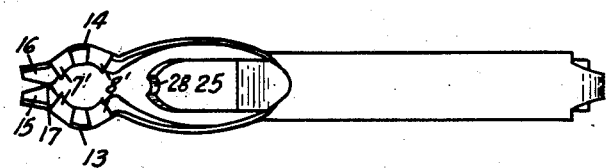
Figure 4 is a bottom view of the completely assembled tool.
Figure 5:
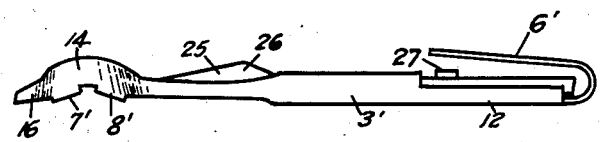
Figure 5 is a side view of the tool shown in Figure 4.

The tongue 25 is adapted to be received for slidable movement in the guide-way 10. When the device is to be used for inserting lock washers of the horseshoe type the tongue may be in retracted position as is shown in Figures 4 and 5. When the device is to be used for inserting lock washers of the split annulus type, the tongue 25 is moved forward between the gripping elements 13 and 14 until its recess 28 is substantially on a line with the tips 15 and 16 of the tool, thus spreading the gripping elements apart and providing two opposite seats, one for each half of the washer. This arrangement of parts greatly increases the security and stability with which washers of varying shapes and sizes may be gripped.

Figure 6:
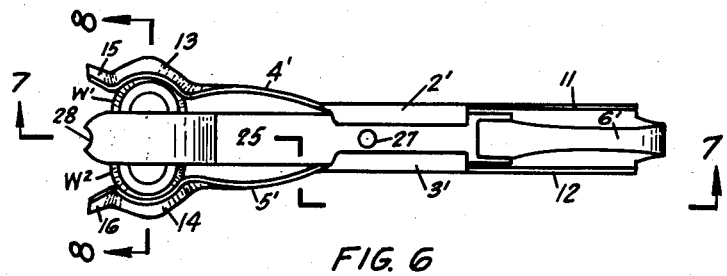
Figure 6 is a top plan view of my tool gripping a set of keepers or washers of very slight taper in readiness to be snapped on to a valve stem.
Figure 7:
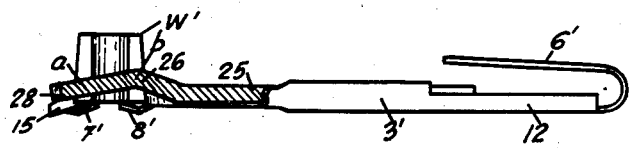
Figure 7 is a cross-sectional view taken along the line 7—7 of Figure 6.
Figure 8:
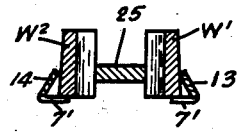
Figure 8 is a cross-sectional view taken along the transverse line 8—8 of Figure 6.

Figures 6, 7 and 8 show the manner in which the device grips a split washer of very slight taper consisting of the two parts $W^1$ and $W^2$. Each part is tightly gripped between the outer edge of the bar 25 and one of the gripping elements 13 or 14. As shown in Figure 8, the bottom of the washer rests on the projections 7' and 8' and the upper edge of the gripping elements 13 and 14 conforms and presses closely about the outer periphery of the washer. As shown in Figure 7, the spreader bar 25 provides two areas $a$ and $b$ of bearing for the inner flat surfaces of the two portions of the washer, the former area being somewhat lower than the latter, thus contributing materially to the stability of the grip.

Figure 10:
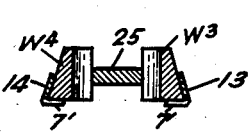
Figure 10 is a transverse cross-sectional view taken along line 10—10 of Figure 9.
Figure 9:
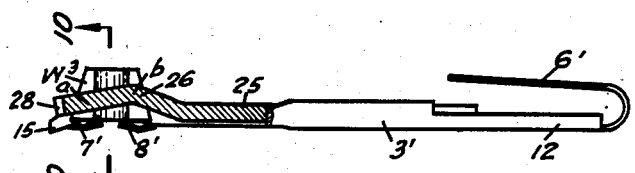
Figure 9 is a cross-sectional view similar to Figure 7 and showing the tool gripping a set of valve keepers or lock washers of considerable taper.

Figures 9 and 10 correspond to Figures 7 and 8 and show the manner in which the two sections $W^3$ and $W^4$ of a split washer of considerable taper are gripped and securely held by my device. A comparison of Figures 8 and 10 shows the wide adaptability of my device—in Figure 8 of the two portions $W^1$ and $W^2$ of the washer of slight taper rest on the projections 7' and 8' and are gripped by the gripping elements 13 and 14 only along their upper edges—in Figure 10 the two portions $W^3$ and $W^4$ of the washer of considerable taper fit closely in the seats formed by the gripping elements 13 and 14 and the projections 7' and 8'. Yet, because of the shape of the gripping elements and of the hump 26 in the tongue 25 providing bearings of both low and high levels, both types of washers are held securely. Further advantages of the structure will appear as the description continues.

Figure 12:
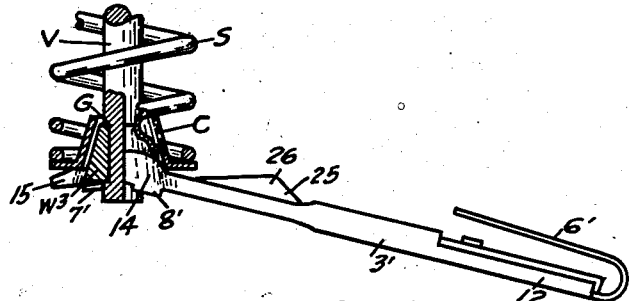
Figure 12 is a side view partly in section and partly broken away showing my tool and the valve stem and its associated parts just as the valve keepers have been snapped on to the valve stem and immediately prior to the removal of the tool.
Figure 11:
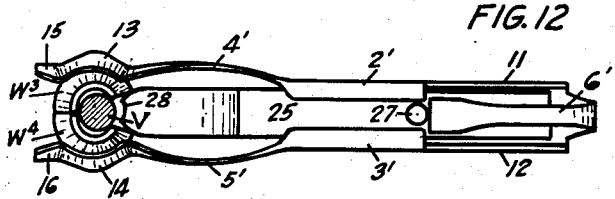
Figure 11 is a top plan view showing an intermediate step in the operation of inserting a set of valve keepers of the split-annulus type in the groove of a valve stem, the valve stem being shown in horizontal cross-section.

As shown in Figure 6, the valve lock washers are being held in readiness to be snapped on to a valve stem. The modus operandi is as follows:—The retainer cup is raised out of the way against the tension of the valve spring by means of an appropriate lifting tool and the loaded device shown in Figure 6 is pressed against the valve stem with the recessed end 28 in the bottom of the groove in the stem, the operator's thumb being pressed tightly down on the tongue 6' which cooperates with the pin 27 on the spreader bar 25 to control the backward movement of the bar. The bar 25 is thus forced backward between the valve washers until the pin 27 comes into contact with the tongue 6'. Figure 11 shows the relationship of parts at this stage of the operation. V denotes the valve stem and $W^3$ and $W^4$ the two sections of the valve keepers or lock washers. As shown in said figure, the front edges of the washers have come into contact encircling the groove of the valve stem, but the rear edges of the washers are still being maintained in spread apart relation by the tapered front end of the spreader bar 25. This enables the operator to examine the washers and ascertain whether they are in proper position. When the operator is satisfied that the washers are in proper position he releases the tongue 6' and the pressure of the rear edges of the washers on the tapered front end of the bar 25 forces the bar 25 backward to its full extent. The operator may then release the lifting tool as the spreader bar is now out of the way of the retainer cup. This action causes the washers to be snapped on to the valve stem and allows the retainer cup to be forced down by the tension of its spring to encircle the upper portions of both the valve washers and the gripping elements. Figure 12 illustrates this stage of the operation. V denotes the valve stem, G the groove in the valve stem, C the retainer cup, S the valve spring and $W^3$ one of the washers. The tool is shown in an inclined position as it is often necessary to approach the valve stem in this manner and the device of my invention renders it possible to approach the stem from any one of a wide range of angles. Furthermore, due to the particular construction of the seat for the washers it is possible to tip my device through a wide range of angles without allowing the washers to be released. And this is so regardless of the shape or size of the washers. When the tool is tipped, the valve washers and their frusto-conical seat appear to act as a universal connection or a ball and socket joint, the washers being closely gripped irrespective of the angle at which the tool is held. An additional advantage that is attributable to the shape of the gripping elements is the fact that the retainer cup when released can closely encircle and engage the valve locks so that when the tool is removed, the locks are prevented from dropping out from the cup. It may be pointed out that the spring S is usually of sufficient strength to force the tool off the washers when the lifting tool is removed.

There are certain advantages that can be attributed to forming the front portion of the tool with the tips 15 and 16. In the first place they provide a bearing for the operator's thumb when loading the tool. In the second place they provide a bearing in the front part of the tool if it is found necessary to tip the tool downwardly to facilitate its removal from the valve locks. In the third place they prevent the tool from becoming caught between the valve locks and the retainer cup.

There are certain advantages residing in making the bottom of the washer seats in the form of projections 7' and 8'. In the first place they cooperate with the gripping members 13 and 14 in preventing the washers from dropping out when the tool is tipped. In the second place they prevent the accumulation of grease and sediment.

A further advantage attributable to my improved construction and arrangement of parts is the fact that the device is of such small breadth that it fits right in between the jaws of the lifting tool. It is to be noted that the tool decreases in breadth as the washers or keepers are snapped on to the valve stem.

The foregoing detailed description has been given for clearness of understanding only and no unnecessary limitations should be understood therefrom. Furthermore, I intend to claim all the novelty inherent in my device and the appended claims should be construed as broadly as possible in view of the prior art.

I claim:—

1. A tool of the class described comprising a body portion, a bar slidably mounted on said body portion, a pair of spring arms integrally formed with said body portion and projecting therefrom, and being adapted to grip the two complementary portions of a split valve washer between them and said bar being adapted to extend between the two complementary portions to maintain them in separated relation until the washers are snapped on to a valve stem, said bar being provided with a vertical pin and said body portion being provided with a spring tongue adapted to cooperate with said vertical pin to limit the rearward movement of the bar.

2. As an element of a tool for snapping valve washers on to a valve stem, a spreader bar having a flat body portion of rectangular cross-section terminating at one end in a pronounced protuberance.

3. As an element of a tool for snapping valve washers on to a valve stem, a spreader bar having a flat body portion of rectangular cross-section and having a pronounced hump near one end, both ends of said bar being in the same horizontal plane.

4. A tool of the class described comprising a body portion provided with a trough-like guide-way, a spreader bar slidably mounted in said guide-way and two bow-shaped spring arms formed integrally with said body portion, each of which arms is fashioned at its free end with a seat for the reception of one of the two portions of a valve washer of the split-annulus type, said body portion and said spreader bar being provided with cooperating elements to limit the rearward movement of said bar, said spreader bar being adapted to extend between the two portions of the said valve washer to maintain them in separated relation.

5. A tool of the class described comprising a body portion provided with a trough-like guide-way, a spreader bar slidably mounted in said guide-way and two bow-shaped spring arms formed integrally with said body portion, each of which arms is fashioned at its free end with a seat for the reception of one of the two portions of a valve washer of the split-annulus type, said spreader bar having a flat body portion of rectangular cross-section terminating in a pronounced protuberance, and being adapted to extend between the two portions of said valve washer to maintain them in separated relation.

SMITH KYSER.